March 22, 1949.  W. P. FERGNANI  2,465,215
SHUTTER MECHANISM FOR PHOTOELECTRIC COUNTERS
Filed June 25, 1948  3 Sheets-Sheet 1
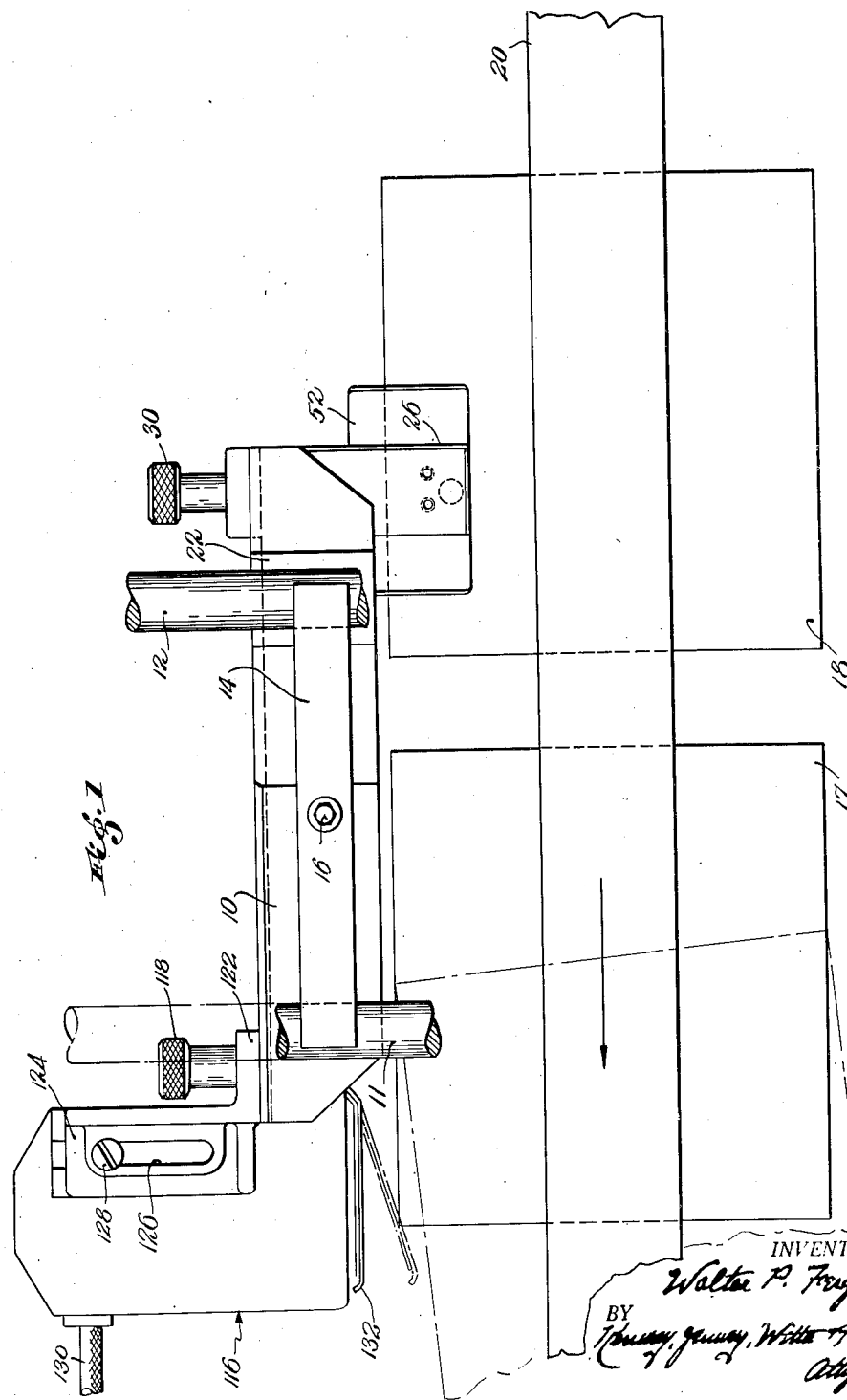
INVENTOR.
Walter P. Fergnani
BY
Attys March 22, 1949. W. P. FERGNANI 2,465,215
SHUTTER MECHANISM FOR PHOTOELECTRIC COUNTERS
Filed June 25, 1948 3 Sheets-Sheet 2
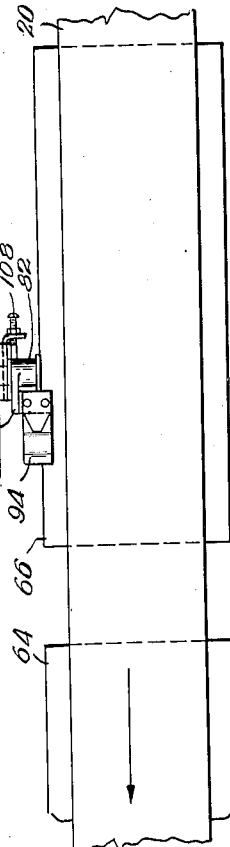
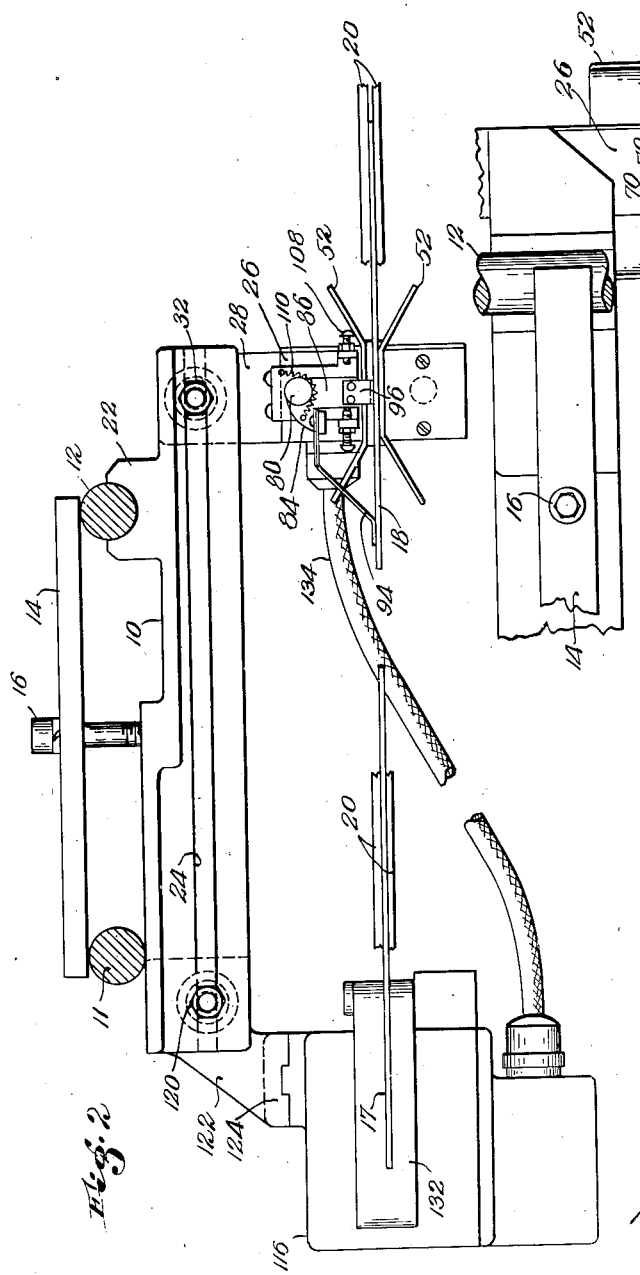
INVENTOR.
Walter P. Fergnani
BY
Kenway, Jenney, Witter & Hildreth
Attys

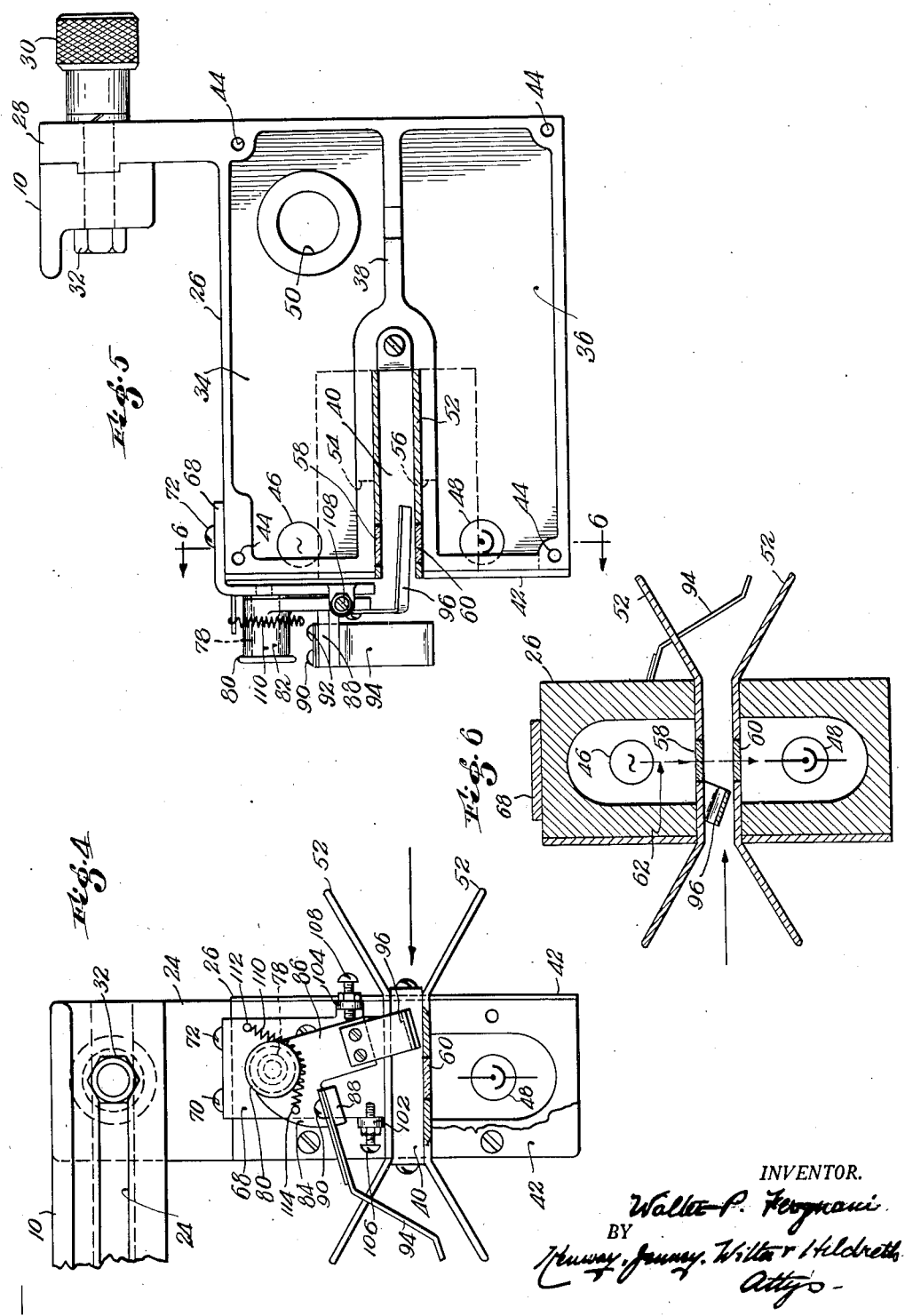

Patented Mar. 22, 1949

2,465,215

UNITED STATES PATENT OFFICE 2,465,215

SHUTTER MECHANISM FOR PHOTO-ELECTRIC COUNTERS

Walter P. Fergnani, Beverly, Mass., assignor to Post Machinery Company, Beverly, Mass., a corporation of Massachusetts Application June 25, 1948, Serial No. 35,265

10 Claims. (Cl. 250—41.5)

This invention comprises a new and improved shutter mechanism for photoelectric counters and has a special field of use in counting articles which are shaped so that of themselves they do not have area available to interrupt a light beam of the character commonly used in photoelectric systems.

While the invention is of broader application, it is herein shown as embodied in a counter for box blanks. In such machines the blanks to be cemented and folded are fed at a high rate of speed between conveyor belts to the operative instrumentalities of the machine. Many blanks are of such size that they project beyond the belts sufficiently to be passed through the light beam and interrupt it completely and momentarily. Other blanks, however, are of such size that they present only a narrow margin projecting beyond the edge of the belt and this margin is of insufficient area to be readily directed in a path that will interrupt the light beam or can be presented therein only with considerable mechanical difficulty. This problem is solved in accordance with the present invention by providing a movable shutter of the proper shape and area for effectively interrupting the light beam and controlling the position of the shutter by a feeler which, upon contact with the margin of a carton or other small object, causes or permits the shutter to move momentarily into operative position while the carton is passing the counting station.

In an illustrative embodiment of the invention, a forked casing is provided having a passage through which successive pieces to be counted may be passed. A lamp is mounted in one branch of the casing and a photocell in the other. A shutter is pivotally mounted upon the casing and shaped to move into said passage for interrupting the beam from the lamp, and a feeler is provided for contacting with the projecting margin of a carton or other small article for causing the shutter to move momentarily into its obscuring position in response to contact. Thus the light beam is momentarily interrupted by the passage of each individual article, and when a predetermined number of responses has occurred, kickout mechanism or some other appropriate device is operated to indicate lots of 25, 50, 100, etc., of the articles being counted.

A general object of the invention is to increase the range and expand the field of usefulness of photoelectric counters by adapting them to handle articles of different dimensions.

One feature of the present invention is the employment of a shutter for the purpose of interrupting the light beam of a photoelectric cell. Another feature comprises a feeler element which operates to control the shutter in response to the passage of articles moving normally out of range of the light beam.

Still another feature consists in a novel adaptor unit quickly attachable to a photoelectric counter, without additional wiring or electrical adjustments.

These and other characteristics of my invention will be best understood and appreciated from the following description of a preferred embodiment thereof, selected for purposes of illustration and shown in the accompanying drawing, in which:

Fig. 1 is a plan view of the assembled elements of the counter mechanism, without the shutter unit, Fig. 2 is a front elevation of the counter mechanism, with shutter unit, Fig. 3 is a fragmentary plan, showing the shutter unit with its feeler contacting an object otherwise too narrow to operate the counter, Fig. 4 is a front elevation on a larger scale of the pick-up head, with shutter unit attached, Fig. 5 is a side elevation of the pick-up head corresponding to Fig. 4, and Fig. 6 is a view in cross-section on the line 6—6 of Fig. 5.

In Fig. 1 is shown a plan view of the counter mechanism without the shutter attachment. The mechanism is mounted upon a bracket 10 adjustably attached to two support rods 11 and 12 by means of a clamping bar 14 and a screw 16 which passes through the center of the bar 14 into the bracket 10. The rods 11 and 12 shown fragmentarily are part of a box folding machine with which the counter mechanism is to be used and may be so located as to position the bracket conveniently near the advancing objects to be counted. In the present instance these objects are box blanks 17 and 18 and these are here shown being advanced between feed belts 20. As shown in Fig. 2, the rod 11 is engaged between a flat surface of the bracket 10 and the bar 14, while the rod 12 fits into a semicircular groove provided in a ribbed portion 22 of the bracket 10. This arrangement eliminates any tendency of the bracket to creep from its adjusted position in the machine. The vertical face of the bracket 10 is slotted at 24 to facilitate the adjustment of parts secured thereto.

In Fig. 1 the box blanks 17 and 18 are shown as being sufficiently wide so that the right side of each enters the forked counter unit casing 26, where as will be shown presently they interrupt a light beam and actuate a photoelectric cell. The counter unit casing 26, or pick-up head as it is also called, is provided with a flange 28 which, as shown in Figs. 1 and 2, is adjustably attached to the slotted bracket 10 by means of the knurled-headed bolt 30 and nut 32.

In the side elevation, Fig. 5, the counter unit casing 26 is shown as formed to provide two chambers 34 and 36, separated by the wall 38 and the forked passageway 40. These chambers are closed by the cover 42 (see Fig. 4) which may be attached by four screws (not shown) engaging the holes 44 provided in the casing 26. The upper chamber 34 contains an electric bulb, diagrammatically shown at 46, while the lower chamber 36 contains a photoelectric cell, diagrammatically shown at 48, directly below the bulb 46. A circular opening 50 in the wall of the upper chamber 34 is provided for a socket (not shown) engaging an electrical plug. The conventional electrical connections have not been illustrated.

As shown in Fig. 6 and Fig. 5 wing-shaped metal guides 52 are provided to assist in forming the passageway 40. The guides 52 serve as a floor and ceiling respectively for the upper chamber 34 where that chamber is recessed at 54, and for the lower chamber 36 where that chamber is recessed at 56. Lenses 58 and 60 fitted in circular holes respectively in said guides 52 serve to direct a beam of light, diagrammatically shown by dotted lines 62 in Fig. 6, from the lamp at 46 to the cell at 48.

Where, as illustrated in Fig. 3, the box blanks (here shown as 64 and 66) are too narrow to extend into the passage 40 of the casing or pick-up head 26, a shutter unit including a bracket 68 is attached to the pick-up head by means of the screws 70 and 72 which fit the threaded holes in the top of the casing 26. The shutter unit is more clearly shown in the enlarged views of Figs. 4 and 5. Its parts are assembled around a right-angle bracket 68. A stud 78 projects horizontally from its vertical portion. This stud provides a pivot with a cap 80 which retains a hub 82, from which depend the two flat arms 84 and 86. The arm 84 is short and is bent at right angles to provide a flange section 88 to which is attached, by means of screws 90 and 92, an obtuse-angled leaf spring feeler 94.

The other arm 86 projects from the hub member 82 at right angles to the stud 78 and carries on its outer end a right-angle metal shutter 96 affixed to the arm 86 by two screws. The angle of the said shutter 96 and the length of the arm 86 are such that as the hub 82 swings on the stud 78 the shutter 96 moves in an arc from one side to the center of the passage 40. Flanges 102 and 104 on opposite edges of the bracket 68, furnished with the adjusting set screws 106 and 108 respectively, operate as variable stops controlling the amplitude of the arc described by the arm 86 and its associated shutter 96.

Normally the arm 86 and shutter 96 are held against the set screw 108 of the flange or stop 104, as shown in Fig. 4, by tension applied by the coiled spring 110 which extends from the pin 112 on the bracket 68 to a pin 114 on the arm 84, and acts to rotate the hub 82 in a counterclockwise direction. However, when the feeler 94 is contacted by a moving box blank 18 as in Fig. 2, the feeler and associated arm 84 are swung in a clockwise direction. The arm 86 and the shutter 96 are similarly swung until the arm 86 is stopped by the set screw 106 in an approximately vertical light interrupting position. As the feeler 94 operates by a light wiping action it is equally effective with objects of varying thickness, permitting them to pass unimpeded. When the object has passed beyond contact with the feeler 94, the feeler, the arm 84 and the hub 82 are returned to normal position as shown in Fig. 4.

In Fig. 6 the shutter 96 is shown as it moves into its vertical position wherein it obscures the light beam 62. An electrical counting mechanism (not shown) is arranged to respond to and record each interruption of the beam, whether the interruption is accomplished by the passage through the beam of a box blank as in Fig. 1 or by the shutter as in Fig. 3. The present shutter attachment thus enables a photoelectric counter to be adapted to a wide operating range without changes in the electrical circuits involved.

Reverting to Fig. 1, a kick-out unit 116 is mounted toward the left end of the slot 24 in the bracket 10 by means of the knurled head bolt 118 and nut 120 which adjustably holds the top flange 122 of an angle bracket 124 in contact with the bracket 10. The base portion of the bracket 124 is provided with a slot 126 which receives a screw 128 in the top of the kick-out unit 116. By loosening the screw 128 the unit 116 may be advanced inwardly relative to the feed belt 20 and thus be positioned properly for handling narrower blanks as they pass through.

The kick-out mechanism, which is not shown in detail, is connected by the cable 130 to an electrical counting mechanism, not shown, which may be set to activate the kick-out unit after 25, 50, 100 or some other predetermined number of blanks have been counted. When the kick-out unit 116 is activated a kick-out arm 132 momentarily is thrust into the position shown by the dotted lines. Thus the box blank 17 carried by the belts 20 is deflected to the position shown by the dot and dash lines and a lot of any predetermined number of the blanks is thus indicated. In Fig. 2 is shown a short length of cable 134 which serves electrically to connect the pick-up mechanism contained in the casing 26 with the kick-out unit 116. The circuit involving the pick-up unit, the kick-out unit, the electrical counter (not shown) and a source of power, is also dependent upon the cable 130 mentioned above.

While variations in the details of the construction shown and described herein will suggest themselves, the invention is not limited to the precise embodiment shown herein but is rather to be measured by the terms of the appended claims.

Having thus disclosed my invention what I claim as new and desire to secure by Letters Patent is:

1. A device of the class described, comprising a forked casing having a horizontal passage through which successive pieces to be counted may be passed, a lamp in one branch of the casing, a photoelectric cell in the other branch, a bracket mounted on the casing, a shutter pivotally mounted thereon and shaped to move into the said passage for interrupting the beam from the lamp, a spring normally holding the shutter in inoperative position out of the light beam, and a feeler also mounted on the bracket and operatively connected to the shutter for moving the same momentarily into operative position.

2. A counter of the class described having a casing with a passage through which successive pieces to be counted may be passed, a lamp located on one side of said passage, a photoelectric cell located on the other side of said passage, a shutter pivotally mounted and movable into the passage for interrupting the beam between the lamp and photoelectric cell, and a feeler also pivotally mounted and operatively connected to the shutter for moving the same momentarily into an operative position.

3. In a photoelectric counter comprising a photoelectric cell and lamp, the combination of a shutter pivotally mounted to move into an operative position interrupting the light beam between the said lamp and photoelectric cell, and a feeler also pivotally mounted and operatively connected to said shutter, whereby an object to be counted will cause said shutter to operate the counter by contact with said feeler.

4. In a photoelectric counter comprising a photoelectric cell and lamp wherein the objects to be counted move between the cell and the lamp momentarily interrupting the beam of the same and thereby activating the counter, the combination of a pivotally mounted shutter movable to interrupt the beam from the lamp, a feeler operatively connected with said shutter for momentarily moving same into operative position, and means for determining the initial position of the feeler.

5. A photoelectric counter unit comprising a bracket, a shutter pivotally mounted on said bracket and shaped to move into operative position activating said counter unit, a feeler connected with said shutter for moving the same momentarily into operative position.

6. An adaptor for a photoelectric counter comprising a bracket, a shutter pivotally mounted therein and having a flat angularly disposed portion shaped to cut off a light beam, an adjustable stop for determining an initial inoperative position of the shutter, a spring connected to the shutter and normally holding it against the stop, and a feeler movable in a path outside the shutter and connected thereto.

7. In a photoelectric counter, an adaptor attachment for counting articles of insufficient width to interrupt the light beam, a bracket, a shutter pivotally mounted on said bracket and shaped to move in an arc part of which lies within the active light path of said counter, a feeler operatively connected with said shutter whereby the shutter may be moved into the light beam when the feeler is contacted by an object to be counted.

8. In a photoelectric counter responsive to the presence of objects to be counted which interrupt a light beam between a lamp and a photoelectric cell, a feeler responsive to objects movable outside the range of the said light beam, and a shutter operatively connected with said feeler and arranged to interrupt said beam upon contact of an object by the feeler.

9. A photoelectric counter comprising a source of light, a photoelectric cell responsive to a beam from said source of light, a casing having a passage between said source of light and said cell through which passage successive objects to be counted may be moved thereby interrupting said beam and actuating said counter, a shutter mounted to move in said passage for interrupting said beam and actuating said counter, and operating means responsive to contact of objects movable in a path outside said passage for advancing the shutter into the light beam when an object to be counted is contacted by said means.

10. A photoelectric counter comprising a source of light, a photoelectric cell responsive to a beam from said source of light, a casing having a passage between said source of light and said cell through which passage successive objects to be counted may be moved thereby interrupting said beam and actuating said counter, a shutter mounted to move in said passage interrupting said beam and actuating said counter, and a feeler responsive to contact of objects to be counted which are movable in a path outside said passage, said feeler being operatively connected to said shutter to advance the shutter into the light beam when an object to be counted is contacted by said feeler.

WALTER P. FERGNANI

No references cited.